United States Patent [19]
Röck et al.

[11] Patent Number: 4,564,306
[45] Date of Patent: Jan. 14, 1986

[54] FURNITURE FITTING

[75] Inventors: Erich Röck, Höchst; Helmut Hollenstein, Dornbirn, both of Austria

[73] Assignee: Julius Blum Gesellschaft m.b.H., Höchst, Austria

[21] Appl. No.: 463,265

[22] Filed: Feb. 2, 1983

[30] Foreign Application Priority Data

Mar. 4, 1982 [DE] Fed. Rep. of Germany ... 8206023[U]

[51] Int. Cl.⁴ .......................... B25G 3/00; F16B 12/00
[52] U.S. Cl. ...................................... 403/14; 403/231; 403/245
[58] Field of Search .................. 403/13, 14, 231, 245, 403/406, 407

[56] References Cited
U.S. PATENT DOCUMENTS 1,190,491  7/1916  Watts et al. .......................... 403/13
3,966,340  6/1976  Morris .................................. 403/353
4,325,649  4/1982  Rock .................................... 403/231

FOREIGN PATENT DOCUMENTS 2358163   6/1974  Fed. Rep. of Germany ...... 403/231
1533252  11/1978  United Kingdom .
2069091   8/1981  United Kingdom .
2080907   2/1982  United Kingdom .

Primary Examiner—Andrew V. Kundrat
Attorney, Agent, or Firm—Wenderoth, Lind & Ponack

[57] ABSTRACT

A fitting for furniture parts includes a dowel casing and a screw or the like. The screw has a head extending into the dowel casing where it is held tight by a locking member. To facilitate the insertion of the screw into the dowel casing conical guide surfaces are provided on the dowel casing.

4 Claims, 3 Drawing Figures

FURNITURE FITTING

FIELD OF THE INVENTION

1. Background of the Invention

The invention relates to a furniture connector for connecting two furniture parts normally arranged to each other, and includes a cylindrical dowel casing insertable into a bore of one furniture part, and having an aperture adapted to receive eccentrically the head of a pin-like connecting member, e.g. a dowel pin or a screw, insertable into the other furniture part. The connecting member is fixable to the dowel casing by means of a locking member rotatably mounted in the dowel casing. The dowel casing preferably is provided with clamping ribs at its circumference.

2. Description of the Prior Art

Such furniture connectors are preferably used for releasably connecting two cabinet walls. The dowel casing is inserted into one cabinet wall, usually adjacent an edge thereof, whereas the other pin-like connecting member is inserted into a front edge of the other furniture wall to be connected. The connecting member is usually eccentrically fixed in the dowel casing, since there should be no projecting edges when the furniture parts have been connected. A central arrangement in the dowel casing of the aperture receiving the connecting member would make the dowel casing project on all sides and, hence, the furniture walls would also project.

When assembling the piece of furniture, the dowel casing is driven into the side of the furniture part, and one connecting member is screwed or pushed into the front edge of the other furniture part. Then, the furniture parts are put together, the connecting member into the aperture in the dowel casing and retaining the head by means of the locking member.

It has often been found difficult to insert the connecting member into the dowel casing when assembling the furniture parts, since the aperture in the dowel casing is covered by the furniture part in which the connecting member is arranged.

SUMMARY OF THE INVENTION

It is, therefore, the object of the invention to provide a furniture connector of this kind which facilitates insertion of the connecting member into the dowel casing.

According to the invention, this is achieved by providing the dowel casing at the aperture receiving the connecting member with a funnel-shaped inserting wall.

An embodiment of the invention provides that the inserting wall has at least one interruption dividing the wall into wall portions.

It is advantageously provided that the inserting wall or the wall portions is or are curved in the inserting direction of the dowel casing.

A further embodiment provides that the inserting wall or the wall portions extends or extend over not more than $\frac{3}{4}$, preferably between $\frac{1}{2}$ und $\frac{2}{3}$, of the circumference of the aperture rim.

BRIEF DESCRIPTION OF THE DRAWINGS

In the following the invention will be described in greater detail with reference to the accompanying drawings, without being limited to the illustrated embodiments and wherein.

DESCRIPTION OF THE PREFERRED EMBODIMENTS

Figure 1:
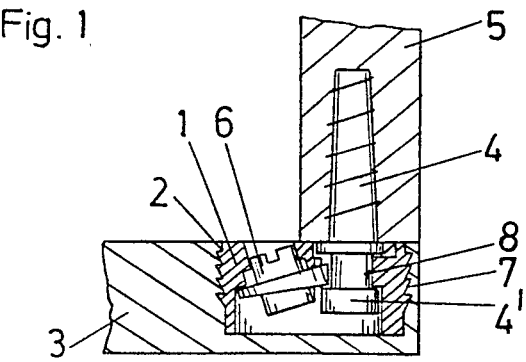
FIG. 1 is a sectional view of a corner connection between two furniture parts by means of a furniture connector according to the invention.

As can be seen in FIG. 1, a dowel casing 1 according to the invention is inserted into a bore 2 at the edge of the side of a furniture wall 3. A connecting member 4, which is a screw in the illustrated embodiment, is arranged in the edge or front side of a corresponding furniture wall 5. When the piece of furniture has been assembled, the dowel casing 1 and the connecting member 4 are connected by means of a locking member 6.

To improve the fit of the dowel casing 1 in the furniture wall 3, dowel casing 1 is provided with circumferential clamping ribs 7.

When the dowel casing 1 is pushed into the furniture wall 3, particular attention must be paid that an aperture 8 in casing 1 for receiving the connecting member 4 is exactly aligned with the position of the connecting member 4 in the mounting position. Slight displacement of the dowel casing 1 would make it impossible to connect the two furniture parts 3,5.

In order to facilitate insertion of the connecting member 4 into the aperture 8 of the dowel casing 1, the casing 1 has therein a funnel-shaped recess leading into aperture 8 and defined by a funnel-shaped inserting wall 9 which is, in the illustrated embodiment, divided into wall portions 9' by an interruption 10.

Figure 2:
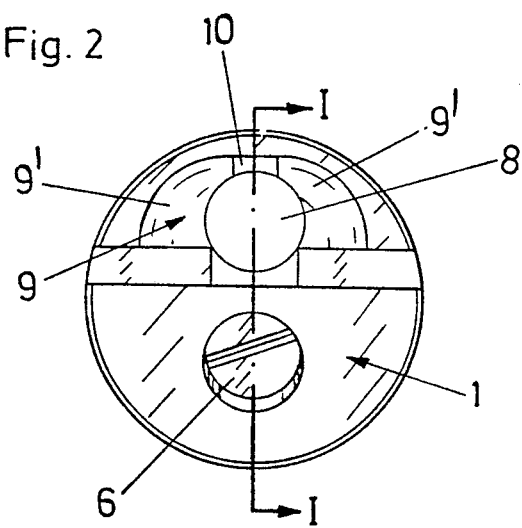
FIG. 2 is a top view of a dowel casing according to the invention.

As shown in FIG. 2, the funnel-shaped recess is elongated in directions generally transverse to a diametral plane I—I of casing 1 which extends through the orifice receiving mounting member 6 and through aperture 8. Thus, the wall 9 defining such recess guides head 4' of connecting member 4 into aperture 8 during assembly. As further will be apparent from FIG. 2, the funnel-shaped recess extends around less than the entire circumference of aperture 8 and specifically is not provided at portions of such circumference directed toward the orifice receiving mounting member 6. Specifically, the recess extends around no more than $\frac{3}{4}$ of the circumference of aperture 8, and preferably from $\frac{1}{2}$ to $\frac{2}{3}$ thereof.

In the illustrated embodiment, the inserting wall 9 is dimensioned to extend around approximately $\frac{2}{3}$ of the circumference of aperture 8.

Figure 3:
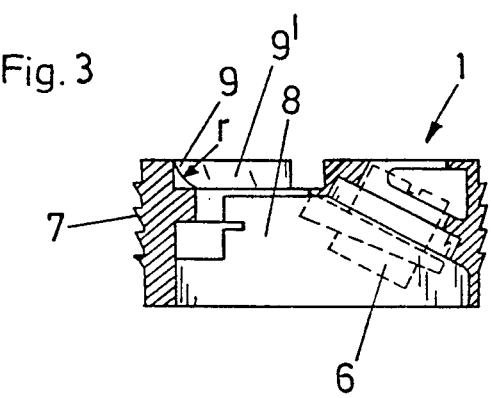
FIG. 3 is a sectional view along line I—I of FIG. 2.

As can be seen in FIG. 3, the inserting wall 9 is curved in the inserting direction of the dowel casing 1 and has, hence, a radius of curvature r.

Due to the construction of the dowel casing according to the invention, the head 4' of a connecting member 4 may be inserted pushed into the aperture 8 if the furniture walls 3,5 are not precisely aligned to each other, during assembly. Hence, an automatic centering is achieved.

What is claimed is:

1. In a joining device for joining at right angles two furniture parts, said joining device including a pin-like connecting member to be fastened to one furniture part and having a head portion, a cylindrical dowel casing to be inserted into a bore in the other furniture part, said casing having an eccentrically positioned aperture through which extends said head of said connecting member, and a holding member rotatably mounted in an inclined orifice in said casing for contacting said head and fixing together said casing and said connecting member, the improvement of means for ensuring reliable insertion of said head into said aperture during assembly of the furniture parts, said means comprising:

a generally funnel-shaped recess formed in said casing to lead into said aperture, said recess being elongated in directions generally transverse of a diametral plane of said casing extending through said orifice and said aperture, thereby guiding said head into said aperture during said assembly; and said recess extending around no more than ¾ of the circumference of said aperture at locations other than that portion of said circumference directed toward said orifice.

2. The improvement claimed in claim 1, wherein said recess extends around between ½ and ⅝ of said circumference of said aperture.

3. The improvement claimed in claim 1, wherein said recess is defined by interrupted wall portions.

4. The improvement claimed in claim 1, wherein said recess is defined by at least one wall which is curved in the direction of insertion of said head into said aperture.

* * * * *